A. J. MANNY.
ROTARY COLTER.

No. 262,446. Patented Aug. 8, 1882.

WITNESSES:
Geo. H. Knight
Walter Allen

INVENTOR:
Abraham J. Manny
By Knight Bro.
Attys

UNITED STATES PATENT OFFICE.

ABRAHAM J. MANNY, OF ST. LOUIS, MISSOURI.

ROTARY COLTER.

SPECIFICATION forming part of Letters Patent No. 262,446, dated August 8, 1882.

Application filed February 5, 1880.

*To all whom it may concern:*

Be it known that I, ABRAHAM J. MANNY, of the city of St. Louis, in the State of Missouri, have invented a certain new and useful Improvement in Rotary Colters, of which the following is a full, clear, and exact description, reference being had to the accompanying drawings, forming part of this specification.

My improvement consists in spreading out, extending, or otherwise expanding a part or parts or the whole of the central portion of a rotary colter from its peripheral plane, when such spreading, extension, or other expansion does not extend to the periphery of the blade and is for the purpose of increasing the axial bearing of the blade upon the hub.

Figure 1:
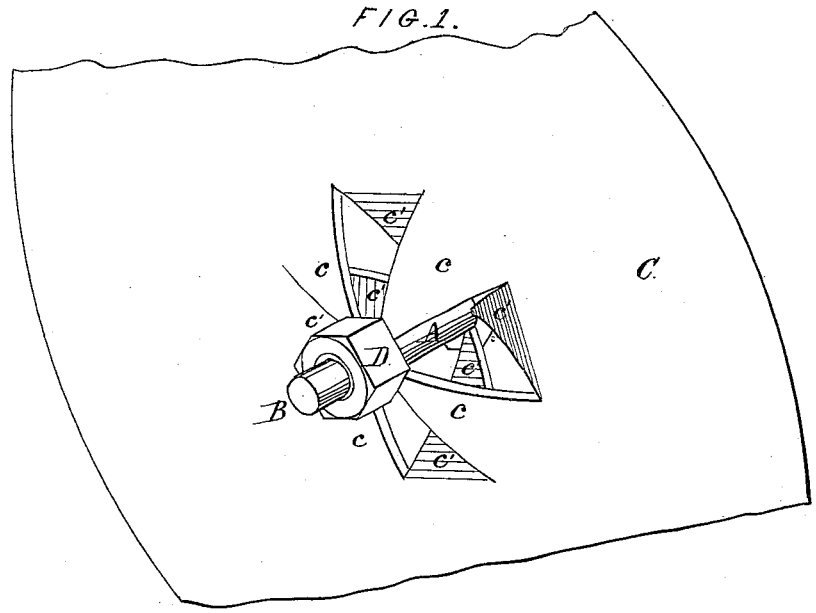
Figure 2:
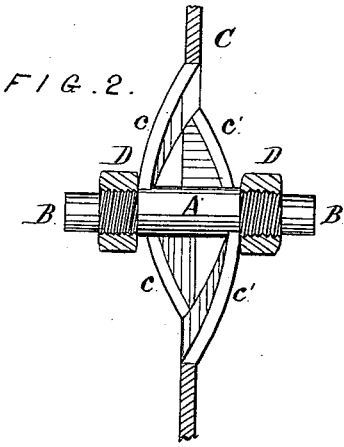

In the drawings, which show one way of carrying out my invention, Figure 1 is a perspective view, and Fig. 2 a transverse section, of the blade or disk in the plane of the axis.

A is the hub. It has two gudgeons, B B, which turn in usual bearings; or the hub may be made tubular and turn on a spindle, or be made in any suitable way. (My present invention does not apply to the hub.)

C is the colter, made circular, as usual. In the way shown of spreading the central part to increase the length of the bearing upon the hub the central part is radially slitted, so as to form it into a number of bearing-points, $c c c' c'$, which are spread or bent outward from the plane of the disk or plate C. The points bear upon the hub A and against the collars or nuts D upon the hub.

It will be seen that the bearing of the colter upon the hub will be very firm, and that the hub may be made very light in weight, the latter feature doing away with an objectionable quality in rotary colters as heretofore constructed. My construction is also cheap.

I do not confine myself to the described construction; but what I consider as my invention is spreading out, extending, or otherwise expanding a part or parts or the whole of the central portion of a rotary colter from its peripheral plane, when such spreading, extension, or other expansion does not extend to the periphery of the blade and is for the purpose of increasing the axial bearing of the blade upon the hub.

Having thus described my invention, the following is what I claim as new therein, and desire to secure by Letters Patent:

1. A rotary colter or cutter made from a single plate of metal, and having lateral expansion at the central portion from its peripheral plane, such expansion not extending to the periphery of the blade.

2. A rotary cutter or colter formed of a single plate of metal, with its central portion radially slitted and the cut parts bent outward alternately in opposite directions to form the bearing for the disk.

ABRAHAM J. MANNY.

Witnesses:
   SAML. KNIGHT,
   GEO. H. KNIGHT.